_United States Patent_ [19]

Pla

[11] Patent Number: 5,584,447
[45] Date of Patent: Dec. 17, 1996

[54] NOISE CONTROL USING A PLATE RADIATOR AND AN ACOUSTIC RESONATOR

[75] Inventor: Frederic G. Pla, Clifton Park, N.Y.

[73] Assignee: General Electric Company, Schenectady, N.Y.

[21] Appl. No.: 359,165

[22] Filed: Dec. 19, 1994

[51] Int. Cl.$^6$ .................................................. B64D 33/00
[52] U.S. Cl. ........................ 244/1 N; 244/1 R; 244/53 R; 310/322; 381/71; 381/159
[58] Field of Search ................................ 244/1 N, 1 R, 244/53 R, 134 D, 134 R; 381/64, 71, 159; 310/322–324; 181/206, 213; 340/388.1, 388.3; 84/410

[56] References Cited

U.S. PATENT DOCUMENTS

| | | | |
|---|---|---|---|
| 1,565,942 | 12/1925 | Jenkins | 381/159 |
| 1,688,743 | 10/1928 | Nicolson . | |
| 3,707,131 | 12/1972 | Massa . | |
| 3,774,867 | 11/1973 | Quinn | 244/204 |
| 4,413,198 | 11/1983 | Bost | 310/322 |
| 4,551,849 | 11/1985 | Kasai et al. . | |
| 4,644,804 | 2/1987 | Ramm et al. | 310/324 |
| 4,700,177 | 10/1987 | Nakashima et al. . | |
| 4,715,559 | 12/1987 | Fuller . | |
| 4,751,419 | 6/1988 | Takahata . | |
| 4,947,434 | 8/1990 | Ito . | |
| 5,031,222 | 7/1991 | Takaya . | |
| 5,370,340 | 12/1994 | Pla . | |

FOREIGN PATENT DOCUMENTS 2124598   5/1990   Japan .

OTHER PUBLICATIONS

Concurrently filed U.S. patent application RD–23569, Frederic G. Pla, entitled "Active Noise Control Using an Array of Plate Radiators and Acoustic Resonators".
Concurrently filed U.S. patent application RD–23317, Frederic G. Pla et al., entitled "Active Noise Control Using a Tunable Plate Radiator".
U.S. patent application Ser. No. 08/143,602, filed Nov. 1, 1993, Frederic G. Pla et al., entitled "Active Noise Control Using Noise Source Having Adaptive Resonant Frequency Tuning Through Stiffness Variation".
U.S. patent application Ser. No. 08/143,605, filed Nov. 1, 1993, Frederic G. Pla etal., entitled "Active Noise Control Using Noise Source Having Adaptive Resonant Frequency Tuning Through Stress Variation".
U.S. patent application Ser. No. 08/143,604, filed Nov. 1, 1993, Frederic G. Pla et al., entitled "Active Noise Control Using Noise Source Having Adaptive Resonant Frequency Tuning Through Variable Panel Loading".
U.S. patent application Ser. No. 08/143,603, filed Nov. 1, 1993, Frederic G. Pla et al., entitled "Active Noise Control Using Noise Source Having Adaptive Resonant Frequency Tuning Through Variable Ring Loading".
See "Background of Invention" in present application.
U.S. patent application RD–23528, Frederic G. Pla et al., entitled "Active Noise Control of Aircraft Engine Discrete Tonal Noise" (filing receipt not yet received).

_Primary Examiner_—Andres Kashnikow
_Assistant Examiner_—Tien Dinh
_Attorney, Agent, or Firm_—Douglas E. Erickson; Marvin Snyder

[57] ABSTRACT

An active noise control subassembly for reducing noise caused by a source (such as an aircraft engine) independent of the subassembly. A noise radiating panel is bendably vibratable to generate a panel noise canceling at least a portion of the source noise. A piezoceramic actuator plate is connected to the panel. A front plate is spaced apart from the panel and the first plate, is positioned generally between the source noise and the panel, and has a sound exit port. A first pair of spaced-apart side walls each generally abut the panel and the front plate so as to generally enclose a front cavity to define a resonator.

2 Claims, 4 Drawing Sheets

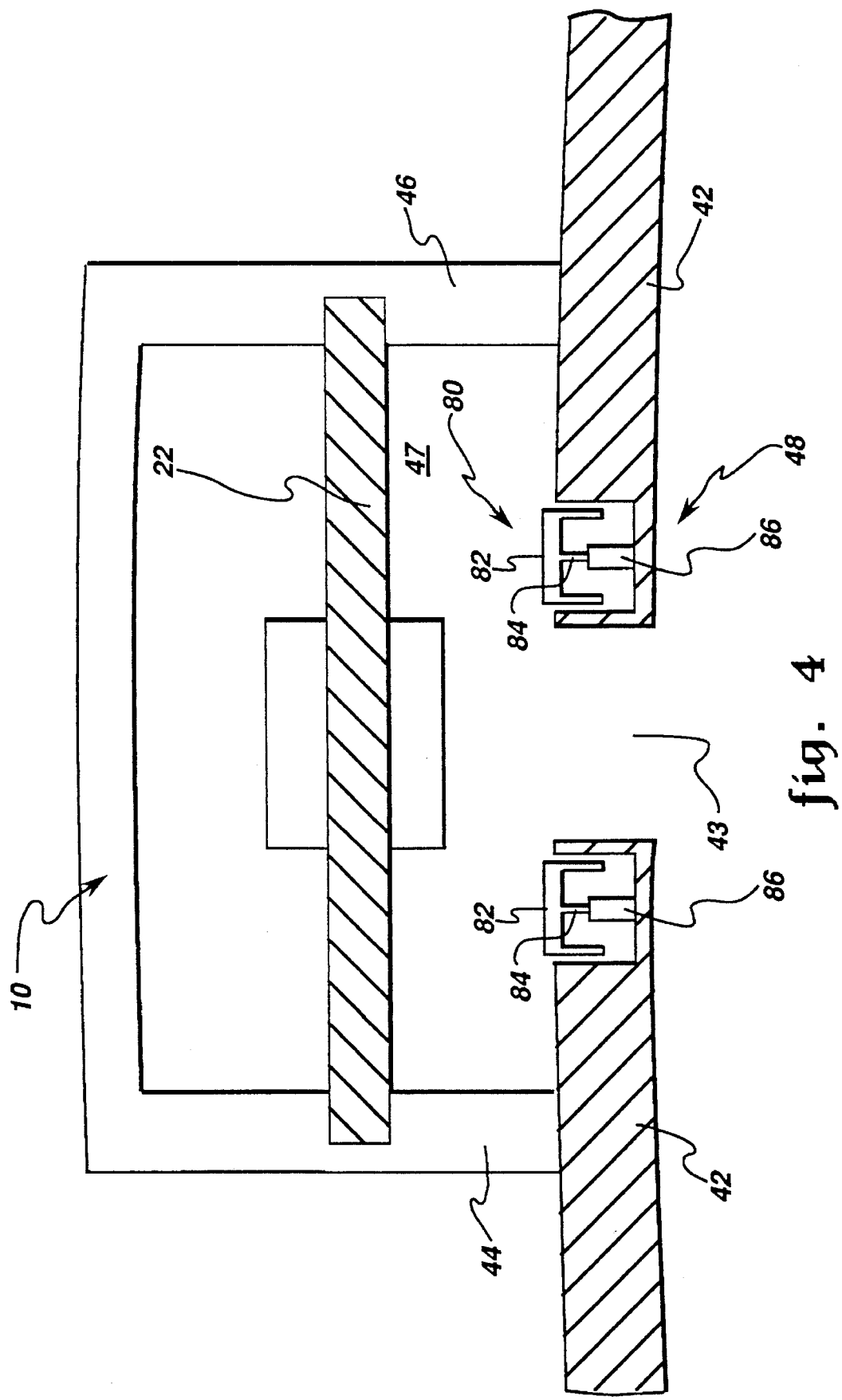

NOISE CONTROL USING A PLATE RADIATOR AND AN ACOUSTIC RESONATOR

This invention described herein was made in the performance of work under NASA Contract No. NAS3-26617 and is subject to the provisions of Section 305 of the National Aeronautics and Space Act of 1958 (42 U.S.C. 2457).

BACKGROUND OF THE INVENTION

The present invention relates generally to reducing noise from a source, and more particularly to an active noise control subassembly capable of generating a canceling noise to offset such source noise.

A noise source may produce discrete tonal noise (having one or more discrete frequencies), narrowband noise, and/or broadband noise. Noise sources include, but are not limited to, medical MRI (magnetic resonance imaging) systems and aircraft engines. Aircraft engines especially produce discrete tonal noise from fans and turbines. Such noise from larger aircraft engines, presently under development, may pose a problem in the vicinity of airports during aircraft take off and landing operations. Also, future aircraft noise regulations may pose a problem for existing aircraft engines.

Known passive noise control techniques for reducing aircraft engine noise include noise absorbing liners and tuned resonators usually mounted at the engine inlet and outlet to reduce the level of discrete tonal noise radiated outside the engine. However, the effectiveness of passive noise control treatment would be greatly reduced for engines with large fan diameters because of the lower fan blade passage frequency.

Known active noise control techniques for reducing aircraft engine discrete tonal noise generate a canceling noise forward and aft of the fan. The frequency of the canceling noise is equal to the blade passage frequency (and/or multiples thereof) as determined from engine speed using a tachometer. The amplitude and phase of the canceling noise is determined by a computer using feedback and/or feedforward control techniques with sound inputs from a microphone array disposed in the vicinity of the fan and the canceling noise such that the canceling noise is generally equal in amplitude and opposite in phase to the engine's discrete tonal noise. It is noted that known active noise control techniques reduce narrowband noise from a source by generating a narrowband canceling noise and reduce broadband noise from a source by reducing a narrowband portion thereof. Conventional techniques for generating the canceling noise include using piezoceramic actuator plates to bendably vibrate a panel to produce the canceling noise. The panel may be a part of the aircraft engine, such as a part of the fan shroud, or the panel may be a member which is separate from, but attached to, the aircraft engine. The piezoceramic plate is driven by an electric AC signal such that when the signal is positive, the plate causes the panel to bendably deflect in a first direction from its resting state, and when the signal is negative, the plate causes the panel to bendably deflect in the opposite direction.

The larger the amplitude of the electric AC signal driving the piezoceramic actuator plate, the larger the bending vibration, and hence the louder the canceling noise, produced by the attached panel. However, the piezoceramic actuator plate will structurally fail when the applied electric AC signal causes the plate to exceed its critical tensile stress which depends on the particular piezoceramic material being used. What is needed is an improved subassembly, of an active noise control system, for generating a loud canceling noise to reduce discrete tonal noise produced by sources such as aircraft engines.

SUMMARY OF THE INVENTION

It is an object of the invention to provide an active noise control subassembly, wherein the subassembly is capable of generating a canceling noise required by an active noise control system for reducing noise produced by a source such as an aircraft engine.

The active noise control subassembly of the invention is for reducing source noise caused by a source independent of the subassembly. The subassembly includes a noise radiating panel and a first piezoceramic actuator plate. The panel has first and second generally opposing sides and is bendably vibratable to generate a panel noise canceling at least a portion of the source noise. The first plate is connected to the first side of the panel such that vibrations in the first plate cause bending vibrations in the panel. The subassembly also includes a front plate spaced apart from the panel and the first plate, positioned generally between the source noise and the panel, and having a sound exit port. The subassembly further includes a first pair of spaced-apart side walls each generally abutting the panel and the front plate so as to generally enclose a front cavity to define a resonator.

In a preferred embodiment, the subassembly additionally includes a device for varying the resonating frequency of the resonator such as by varying the volume of the front cavity or the area or thickness of the sound exit port.

Several benefits and advantages are derived from the invention. The subassemblies combine piezoceramics and resonators in a compact design reducing the space needed for noise control. The resonator can be tuned to have its resonating frequency equal that of the panel thereby boosting the amplitude of the canceling noise.

BRIEF DESCRIPTION OF THE DRAWINGS

The accompanying drawings illustrate a preferred embodiment of the present invention wherein:

FIG. 4 is an enlarged view of the subassembly of FIG. 1 also showing a preferred embodiment for varying the thickness of the sound exit port of the resonator.

DETAILED DESCRIPTION OF THE INVENTION

Figure 1:
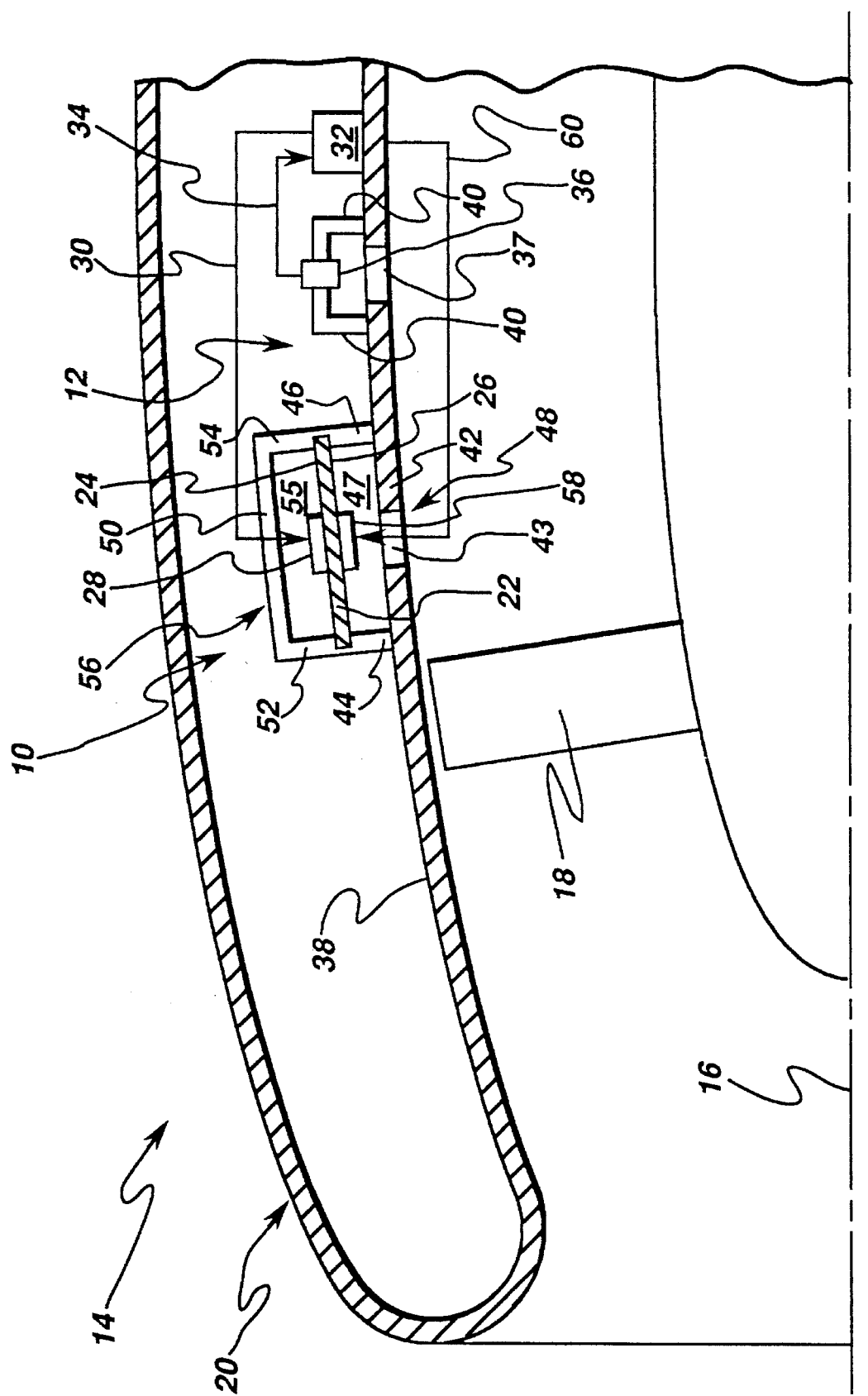
FIG. 1 is a schematic side-elevational, cross-sectional view of a front portion of an aircraft engine including a preferred embodiment of the active noise control subassembly of the invention.

Referring now to the drawings, wherein like numerals represent like elements throughout, FIG. 1 shows the active noise control subassembly 10 of the present invention. The active noise control subassembly 10, which is part of an active noise control system 12, is for reducing source noise caused by a source independent of the subassembly 10. The invention will be described in terms of the noise being discrete tonal noise having one or more discrete frequencies and the source being an aircraft engine 14 (only the front portion of which is shown in FIG. 1). However, it is understood that the noise can also be narrowband and/or broadband noise and the source can be any source of noise. The aircraft engine 14, which has a generally longitudinally extending centerline 16, includes a fan 18 which rotates within a fan nacelle 20 producing discrete tonal noise predominately at the blade passage frequency and multiples thereof, as can be appreciated by those skilled in the art. It is noted that aircraft engines without fans also produce discrete tonal noise, such as, but not limited to, noise coming from their turbine blades (such turbine blades being omitted from FIG. 1 for clarity).

The active noise control subassembly 10 includes a noise radiating panel 22 bendably vibratable to generate a panel noise canceling at least a portion of the source noise (e.g., the discrete tonal noise of the aircraft engine 14). In some applications, the noise radiating panel is an already existing aircraft engine member, such as the aircraft engine fan shroud (not shown in the figures). In other applications, such as that shown in FIG. 1, the noise radiating panel 22 is a separate member (such as a sheet of 1.5 millimeter thick aluminum) specifically installed in the aircraft engine 14 for noise control purposes. The noise radiating panel 22 has first and second generally opposing sides 24 and 26 and a panel resonating frequency.

The active noise control subassembly 10 also includes a first piezoceramic actuator plate 28 which is vibratable by a first applied electric AC signal 30 generated by a controller 32. The first piezoceramic actuator plate 28 is connected to the first side 24 of the noise radiating panel 22 such that vibrations in the first plate 28 cause bending vibrations in the panel 22. The first applied electric AC signal 30 generated by the controller 32 is such that the bending vibrations in the noise radiating panel 22 produce a panel noise canceling at least a portion of the source noise (e.g., panel noise which is generally opposite in phase to at least a portion of the discrete tonal noise of the aircraft engine 14). In an exemplary embodiment, such discrete tonal noise of the aircraft engine 14 is calculated by the controller 32 in part from engine speed measured by a tachometer (omitted from FIG. 1 for clarity) and in part from a signal 34 of aircraft engine noise from a microphone 36 disposed within the fan nacelle 20 over a sound port 37 in the inner wall 38 of the fan nacelle 20 and attached to supports 40 which are secured to the inner wall 38 of the fan nacelle 20. A best mode would use an array of microphones 36 flush mounted to the inner wall 38 (such arrangement not shown in the figures). The controller 32 may be a digital or analog computer or other control device, as is known to those skilled in the art. It is noted that the active noise control system 12 includes the active noise control subassembly 10, the microphone 36, the tachometer (omitted from FIG. 1 for clarity), and the controller 32. A best mode would employ a system 12 forward and aft of the fan 18.

For purposes of describing the invention, the term "piezoceramic" refers to a material which exhibits a piezoelectric effect and is not limited to commonly called piezoceramic materials but also includes electrostrictive materials while excluding magnetostrictive materials. Typically, the first piezoceramic actuator plate 28 is a sheet (e.g., 50×50×0.25 millimeters) of piezoceramic material bonded to the flat or curved noise radiating panel 22 using an epoxy or alkyl cyanolate compound. Vacuum pads or weights are sometimes used during the bonding process to apply a uniform pressure on the first plate 28, especially when bonding the plate to a curved panel surface. Preferably, a compressive prestress is created in the first plate 28 during the bonding process. A positive electric DC bias in the poling direction may also be added to the first applied electric AC signal 30.

The active noise control subassembly 10 additionally includes a front plate 42. The front plate 42 is spaced apart from the panel 22 and the first plate 28, is disposed generally between the source noise and the panel 22, and has a sound exit port 43 having an area and a thickness. The subassembly 10 further includes a first pair of spaced-apart side walls 44 and 46 each generally abutting the panel 22 and the front plate 42 so as to generally enclose a front cavity 47 to define a resonator 48 (such as, but not limited to, a Helmholtz resonator). It is noted that the spaced-apart side walls 44 and 46 are shown attached to the panel 22 in FIGS. 1, 3, and 4 and are shown unattached to the panel 22 in FIG. 2. The front cavity 47 has a volume, and the resonator 48 has a resonator resonating frequency. Preferably, the resonator resonating frequency is equal to generally the panel resonating frequency as can be achieved by those of ordinary skill in the art. For a typical panel area of 0.02 square meters, a front cavity volume of 0.125 cubic centimeters, a sound exit port area of 0.2 square centimeters and thickness of 0.5 centimeters, and panel and resonator resonating frequencies each of 1000 Hertz, calculations showed an increase in acoustic power of two orders of magnitude (20 decibels) at 1000 Hertz with improved acoustic power up to about 1700 Hertz when compared with the acoustic power of just the panel 22 without the resonator 48. When the subassembly 10 is used for reducing discrete tonal noise caused by an aircraft engine 14 having a fan 18, it is preferred that the front plate 42 is a shaped portion of the inner wall 38 of the fan nacelle 20 as shown in FIG. 1.

The subassembly 10 preferably includes a back plate 50 spaced apart from the first plate 28 and the panel 22 with the panel 22 disposed generally between the source noise and the back plate 50, and the subassembly 10 preferably further includes a second pair of spaced-apart side walls 52 and 54 each generally abutting the panel 22 and the back plate 50 so as to generally enclose a back cavity 55 and define a chamber 56. It is noted that the spaced-apart side walls 52 and 54 are shown attached to the panel 22 in FIGS. 1, 3, and 4 and are shown unattached to the panel 22 in FIG. 2. In an exemplary embodiment, the chamber 56 may be used as a tuning chamber to vary the panel resonating frequency while the panel 22 is undergoing bending vibrations. This may be done by varying the state of the back cavity 55 such as by varying its fluid pressure and/or volume.

In a preferred embodiment, the active noise control subassembly 10 includes a second piezoceramic actuator plate 58 which is vibratable by a second applied electric AC signal 60 generated by the controller 32. The second piezoceramic actuator plate 58 is connected to the second side 26 of the noise radiating panel 22 such that vibrations in the second plate 58 cause bending vibrations in the panel 22. The second applied electric AC signal 60 generated by the controller 32 is such that the bending vibrations in the noise radiating panel 22 produce a panel noise canceling at least a portion of the source noise (e.g., panel noise which is generally opposite in phase to at least a portion of the discrete tonal noise of the aircraft engine 14). It is noted that the first and second piezoceramic actuator plates 28 and 58 are powered "out-of-phase" so that, for example, the first plate 28 expands while the second plate 58 contracts. When two piezoceramic actuator plates 28 and 58 are used, it is preferred that their combined effect results in causing bending vibrations in the noise radiating panel 22 which produce a canceling noise which is generally equal in amplitude to at least a portion of the aircraft engine discrete tonal noise. It is also preferred that when only one piezoceramic actuator plate 28 or 58 is used, its effect results in causing bending vibrations in the panel 22 which produce a canceling noise generally equal in amplitude to at least a portion of the aircraft engine discrete tonal noise.

In certain applications, an array (not shown in the figures) of subassemblies 10 may be used including a pair of subassemblies spaced apart to create a space between adjacent side walls of the pair and including a third subassembly stacked on top of the pair with the space defining the sound exit port of the third subassembly.

In an exemplary embodiment, the active noise control subassembly 10 includes means for varying the resonator resonating frequency while the panel 22 is undergoing the bending vibrations. This allows the controller 32 to use adaptive control techniques to vary, for example, the frequency of the canceling noise from the resonator 48 to match a changing frequency in the discrete tonal noise of the source (e.g., an aircraft engine 14).

Figure 2:
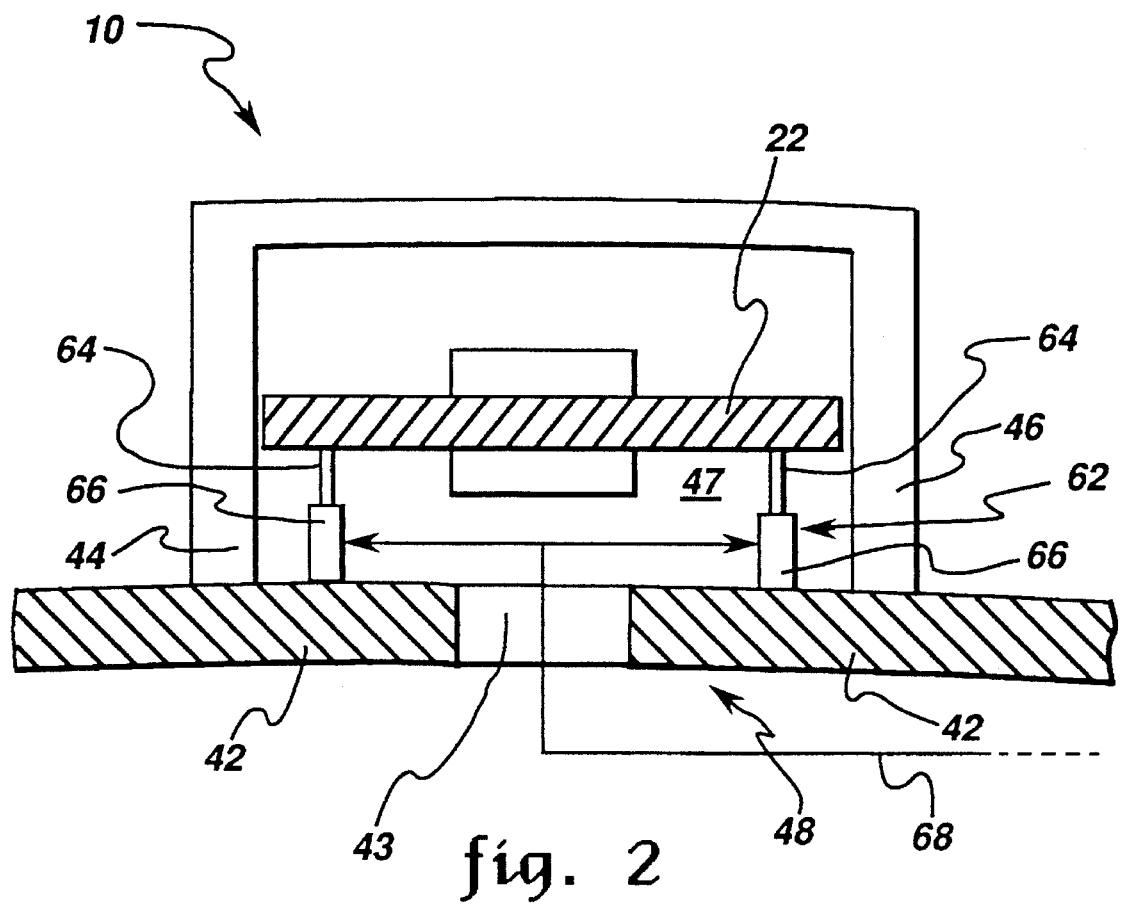
FIG. 2 is an enlarged view of the subassembly of FIG. 1 also showing a preferred embodiment for varying the volume of the front cavity of the resonator.

In a first preferred construction, the frequency varying means includes means 62 for varying the volume of the front cavity 47 while the panel 22 is undergoing the bending vibrations. Preferably, as seen in FIG. 2, such means 62 includes the panel 22 being supported by movable pistons 64 (with a preferred panel frame omitted from FIG. 2 for clarity) of powered cylinders 66 controlled by an adaptive signal 68 from the controller 32 (such origination of the adaptive signal 68 from the controller 32 omitted from FIG. 2 for clarity). Other such means 62 includes movable or telescoping side walls and/or an inflatable diaphragm (not shown) disposed in the front cavity 47.

Figure 3:
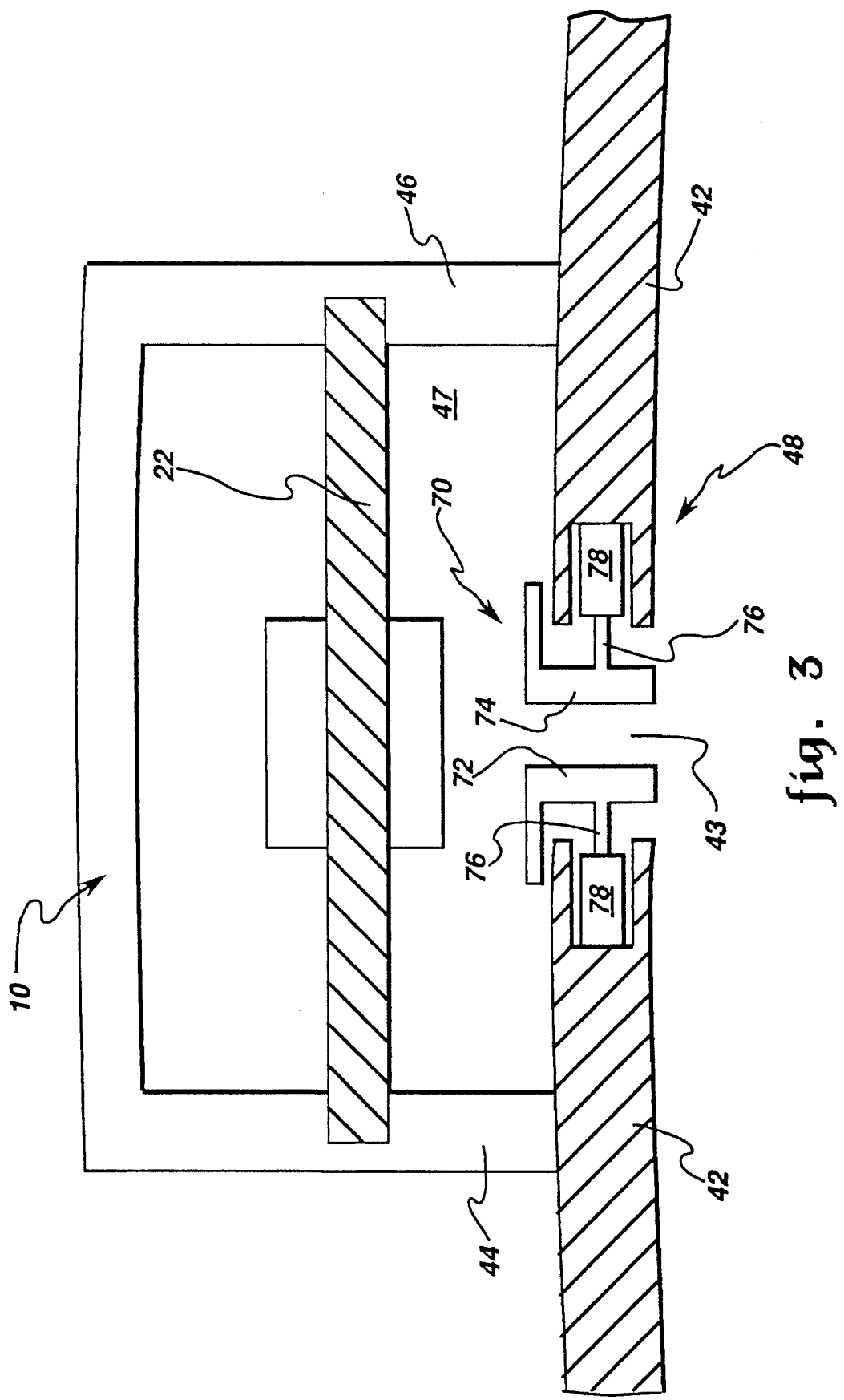
FIG. 3 is an enlarged view of the subassembly of FIG. 1 also showing a preferred embodiment for varying the area of the sound exit port of the resonator.

In a second preferred construction, the frequency varying means includes means 70 for varying the area of the sound exit port 43 of the front plate 42 while the panel 22 is undergoing the bending vibrations. Preferably, as seen in FIG. 3, such means 70 includes the (preferably rectangular-shaped) sound exit port 43 having lateral walls 72 and 74 supported by movable pistons 76 of powered cylinders 78 controlled by an adaptive signal (omitted from FIG. 3 for clarity) from the controller 32. Other such means 70 includes a variable aperture shutter valve and an inflatable diaphragm (both not shown) disposed in the sound exit port 43.

In a third preferred construction, the frequency varying means includes means 80 for varying the thickness of the sound exit port 43 of the front plate 42 while the panel 22 is undergoing the bending vibrations. Preferably, as seen in FIG. 4, such means 80 includes the (preferably circular-shaped) sound exit port 43 having a nearby lift ring 82 which is supported by movable pistons 84 of powered cylinders 86 controlled by an adaptive signal (omitted from FIG. 4 for clarity) from the controller 32. Extending or retracting the lift ring 82 increases or decreases the thickness of the sound exit port 43.

The foregoing description of a preferred embodiment of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

I claim:

1. An active noise control subassembly for reducing source noise caused by a source independent of said subassembly, said subassembly comprising:

a) a noise radiating panel bendably vibratable to generate a panel noise canceling at least a portion of said source noise, said panel having first and second generally opposing sides and a panel resonating frequency;

b) a first piezoceramic actuator plate connected to said first side of said panel such that vibrations in said first piezoceramic actuator plate cause bending vibrations in said panel;

c) a front plate spaced apart from said first piezoceramic actuator plate and said panel, disposed generally between said source noise and said panel, and having a sound exit port having an area and a thickness;

d) a first pair of spaced-apart side walls each generally abutting said panel and said front plate so as to generally enclose a front cavity to define a resonator, said front cavity having a volume and said resonator having a resonator resonating frequency; and e) means for varying said resonator resonating frequency while said panel is undergoing said bending vibrations, wherein said frequency varying means includes means for varying said volume of said front cavity while said panel is undergoing said bending vibrations.

2. An active noise control subassembly for reducing source noise caused by a source independent of said subassembly, said subassembly comprising:

a) a noise radiating panel bendably vibratable to generate a panel noise canceling at least a portion of said source noise, said panel having first and second generally opposing sides and a panel resonating frequency;

b) a first piezoceramic actuator plate connected to said first side of said panel such that vibrations in said first piezoceramic actuator plate cause bending vibrations in said panel;

c) a front plate spaced apart from said first piezoceramic actuator plate and said panel, disposed generally between said source noise and said panel, and having a sound exit port having an area and a thickness;

d) a first pair of spaced-apart side walls each generally abutting said panel and said front plate so as to generally enclose a front cavity to define a resonator, said front cavity having a volume and said resonator having a resonator resonating frequency; and e) means for varying said resonator resonating frequency while said panel is undergoing said bending vibrations, wherein said frequency varying means includes means for varying said thickness of said sound exit port of said front plate while said panel is undergoing said bending vibrations.

\* \* \* \* \*